United States Patent [19]
Bayley

[11] Patent Number: 6,101,173
[45] Date of Patent: Aug. 8, 2000

[54] ADAPTIVE REACQUISITION TIME IN A SLOTTED PAGING ENVIRONMENT

[75] Inventor: Gwain Bayley, San Diego, Calif.

[73] Assignee: QUALCOMM Incorporated, San Diego, Calif.

[21] Appl. No.: 09/039,985

[22] Filed: Mar. 16, 1998

[51] Int. Cl.[7] .................................................. H04B 7/216
[52] U.S. Cl. ......................... 370/311; 370/335; 370/515
[58] Field of Search ................................... 370/311, 335, 370/342, 350, 441, 479, 500, 503, 512, 515, 516; 375/138, 147, 148, 149, 150, 152, 226, 317, 362, 364, 367; 455/383, 343

[56] References Cited

U.S. PATENT DOCUMENTS

| | | | |
|---|---|---|---|
| 3,715,508 | 2/1973 | Blasbalg | 179/15 |
| 4,052,565 | 10/1977 | Baxter | 179/1.5 |
| 4,301,530 | 11/1981 | Gutleber | 370/18 |
| 4,460,992 | 7/1984 | Gutleber | 370/19 |
| 4,472,815 | 9/1984 | Gutleber | 375/34 |
| 4,635,221 | 1/1987 | Kerr | 364/821 |
| 4,730,340 | 3/1988 | Frazier, Jr. | 375/1 |
| 4,866,709 | 9/1989 | West et al. | 370/82 |
| 4,872,200 | 10/1989 | Jansen | 380/34 |
| 4,901,307 | 2/1990 | Gilhousen et al. | 370/18 |
| 4,933,952 | 6/1990 | Albrieux et al. | 375/1 |
| 4,939,745 | 7/1990 | Kirimoto et al. | 375/1 |
| 5,040,172 | 8/1991 | Mano et al. | 370/29 |
| 5,101,501 | 3/1992 | Gilhousen et al. | 455/33 |
| 5,103,459 | 4/1992 | Gilhousen et al. | 375/1 |
| 5,159,596 | 10/1992 | Itoh | 370/95.1 |
| 5,167,024 | 11/1992 | Smith et al. | 395/375 |
| 5,175,874 | 12/1992 | Auchter | 455/89 |
| 5,177,765 | 1/1993 | Holland et al. | 375/1 |
| 5,203,020 | 4/1993 | Sato et al. | 455/68 |
| 5,363,401 | 11/1994 | Lucas et al. | 375/1 |
| 5,363,430 | 11/1994 | Yamagata et al. | 379/61 |
| 5,566,357 | 10/1996 | Holcman | 455/54.1 |
| 5,566,366 | 10/1996 | Russo et al. | 455/343 |
| 5,590,396 | 12/1996 | Henry | 455/33.1 |
| 5,625,882 | 4/1997 | Vook et al. | 455/38.3 |
| 5,627,882 | 5/1997 | Chien et al. | 379/61 |
| 5,644,591 | 7/1997 | Sutton | 375/200 |
| 5,649,315 | 7/1997 | Eaton | 455/343 |
| 5,694,388 | 12/1997 | Sawahashi et al. | 370/206 |
| 5,696,789 | 12/1997 | Jones et al. | 375/200 |
| 5,708,658 | 1/1998 | Sugita | 370/335 |
| 5,790,589 | 8/1998 | Hutchison, IV et al. | 375/200 |
| 5,889,768 | 3/1999 | Storm et al. | 370/320 |

FOREIGN PATENT DOCUMENTS

| | | | |
|---|---|---|---|
| 9200639 | 1/1992 | WIPO | H04L 27/30 |

OTHER PUBLICATIONS

"Nonlinear Estimation of PSK–Modulated Carrier Phase with Application to Burst Digital Transmission"; *IEEE Transactions on Information Theory*, vol. IT–29, No. 4, Jul. 1983; Andrew J. Viterbi and Audrey M. Viterbi; pp. 543–551.

"Orthogonal Sets of Functions"; *Advanced Engineering Mathematics*, 1979; Chapter 4.7, pp. 186–190; Erwin Kreyzig.

*Primary Examiner*—Chi H. Pham
*Assistant Examiner*—Kwang B. Yao
*Attorney, Agent, or Firm*—Philip R. Wadsworth; Roger W. Martin; Charles D. Brown

[57] ABSTRACT

A method and circuit for adaptively determining a pilot signal reacquisition time. A searcher subsystem measures a phase of the pilot signal. A control processor measures a magnitude of a shift in the pilot signal phase, compares the measured magnitude to a shift threshold, and decreases the reacquisition time if the measured magnitude is not greater than the shift threshold. The control processor also may compare the reacquisition time to a minimum reacquisition time, and decrease the reacquisition time only if the reacquisition time is greater than the minimum reacquisition time. Additionally, the control processor may increase the reacquisition time to a maximum reacquisition time if the measured magnitude is greater than said shift threshold.

8 Claims, 2 Drawing Sheets

ADAPTIVE REACQUISITION TIME IN A SLOTTED PAGING ENVIRONMENT

BACKGROUND OF THE INVENTION

I. Field of the Invention

The present invention relates to wireless communication devices. More particularly, the present invention relates to a novel and improved method and apparatus for adaptively determining the time necessary to perform reacquisition of a pilot signal in a slotted paging environment.

II. Description of the Related Art

In many wireless communication systems, the mobile receiver is only sporadically active. For example, in a wireless communication system which employs slotted paging, the base station transmits a paging channel which is time-divided into a repeating cycle of slots. Each mobile receiver associated with that base station typically monitors only a single one of the slots in each slot cycle. During the non-assigned slots, the mobile receiver remains in an idle state in which the base station does not send any messages to that mobile receiver, but may send messages to other mobile receivers during their respective assigned slots. In the idle state, the mobile receiver may perform any action not requiring coordination with the base station. Typically, the mobile receiver uses the majority of idle time during non-assigned slots to reduce power consumption by removing power from one or more components, such as those components used for receiving signals from the base station.

This reduced power consumption mode is often referred to in the art as a "sleep" mode. Typically, the mobile receiver will "wake up" from this sleep mode at some time prior to its assigned slot, reacquire the pilot signal of the base station in order to re-synchronize its own internal timing with that of the base station, and then may perform any other actions necessary to prepare it to receive a message at the beginning of its upcoming assigned slot. An example of a wireless communication system which operates in accordance with the above-described principles is given in U.S. Pat. No. 5,392,287, entitled "APPARATUS AND METHOD FOR REDUCING POWER CONSUMPTION IN A MOBILE COMMUNICATIONS RECEIVER," assigned to the assignee of the present invention and incorporated herein by reference.

In a dynamic environment, where the mobile receiver is moving with respect to the base station, the arrival time of the pilot signal at the mobile receiver may change rapidly. This is particularly problematic in a CDMA system, such as that described in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference. In a CDMA system like that of the just-mentioned patent, a shift in the arrival time of the pilot signal at the mobile receiver causes the location of the pilot signal in the PN spreading code to change with respect to the mobile receiver. The longer that the mobile receiver is in the "sleep" mode while moving, the more that the actual pilot signal arrival time may differ from the expected pilot signal arrival time as measured by a freewheeling internal timer inside the mobile receiver. Thus, in a CDMA system like that mentioned above, the actual pilot signal received by the mobile receiver may shift by one or more PN chips while the mobile receiver is "asleep" (i.e. not despreading the pilot signal), resulting in a longer reacquisition procedure because the actual pilot signal arrival time will not match the expected pilot signal arrival time when the mobile receiver "awakens" to reacquire the pilot signal.

In such a dynamic environment, the wakeup time of the mobile receiver before the beginning of the assigned slot must be sufficiently long to allow the mobile receiver to reacquire a pilot signal which may have shifted dramatically in time. In the above-incorporated U.S. Pat. No. 5,392,287, the mobile receiver wakes up a short, but fixed, time before the next occurrence of its assigned slot. This time is generally referred to in the art as "reacquisition time." Empirically, this fixed reacquisition time has been determined to be on the order of about 80 ms. The mobile receiver performs a reacquisition of the pilot signal to realign its internal timing with that of the base station during this reacquisition time prior to the beginning of the assigned slot. An exemplary reacquisition method may be found in copending U.S. patent application Ser. No. 08/696,769, filed Aug. 14, 1996, entitled "SYSTEM AND METHOD FOR RAPIDLY REACQUIRING A PILOT CHANNEL," assigned to the assignee of the present invention and incorporated herein by reference.

In the just mentioned patent, the time it takes to successfully reacquire the pilot channel is roughly proportional to the amount that the actual pilot signal received by the mobile receiver has drifted in time relative to the expected pilot signal arrival time. Thus, the more the actual pilot signal has drifted, the longer it will take to reacquire it. As a result, if a fixed wakeup time before the occurrence of the next assigned slot is used, it must be sufficiently long to allow for the "worst case" drift in the received pilot signal between the time that the mobile receiver entered the sleep mode and the time that it awakens. Otherwise, if the mobile receiver has not yet reacquired the pilot signal before the beginning of the assigned slot, it may miss part or all of a message transmitted by the base station during that slot. If, however, the mobile receiver is relatively stationary, then the actual pilot signal arrival time will be very close to the expected pilot signal arrival time. In this case, successful reacquisition will occur a significant time before the beginning of the assigned slot, and the mobile receiver will merely "wait" for its next assigned slot to begin. During this waiting time, power is applied to all of the receiver components, resulting in significant power consumption, and consequent battery drain.

What is needed is a mobile receiver that "wakes up" from sleep mode just in time to successfully reacquire the pilot signal, without spending extra time waiting for the beginning of the next assigned slot. Furthermore, such a mobile receiver must be able to successfully reacquire the pilot signal in a stationary environment as well as in a rapidly changing dynamic environment. In other words, what is needed is a mobile receiver which adaptively determines the time necessary to perform reacquisition of a pilot signal in a slotted paging environment, without wasting battery power, and also without losing incoming page messages.

SUMMARY OF THE INVENTION

The present invention is a novel and improved method and circuit for adaptively determining the time necessary to perform reacquisition of a pilot signal in a slotted paging environment. The method includes measuring a magnitude of a shift in phase of the pilot signal and comparing the measured magnitude to a shift threshold. The method further includes decreasing the reacquisition time if the measured magnitude is not greater than the shift threshold.

Additionally, the method includes comparing the reacquisition time to a minimum reacquisition time, and decreasing the reacquisition time only if the reacquisition time is greater than the minimum reacquisition time. The method may further include increasing the reacquisition time to a maximum reacquisition time if the measured magnitude is greater than the shift threshold. The mobile receiver then enters a sleep mode until the reacquisition time before a next assigned paging slot.

The present invention also includes a circuit for adaptively determining a pilot signal reacquisition time. The circuit comprises a searcher subsystem for measuring a phase of the pilot signal, and a control processor. The control processor measures a magnitude of a shift in the pilot signal phase, compares the measured magnitude to a shift threshold, and decreases the reacquisition time if the measured magnitude is not greater than the shift threshold. The control processor also may compare the reacquisition time to a minimum reacquisition time, and decrease the reacquisition time only if the reacquisition time is greater than the minimum reacquisition time. Additionally, the control processor may increase the reacquisition time to a maximum reacquisition time if the measured magnitude is greater than said shift threshold.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
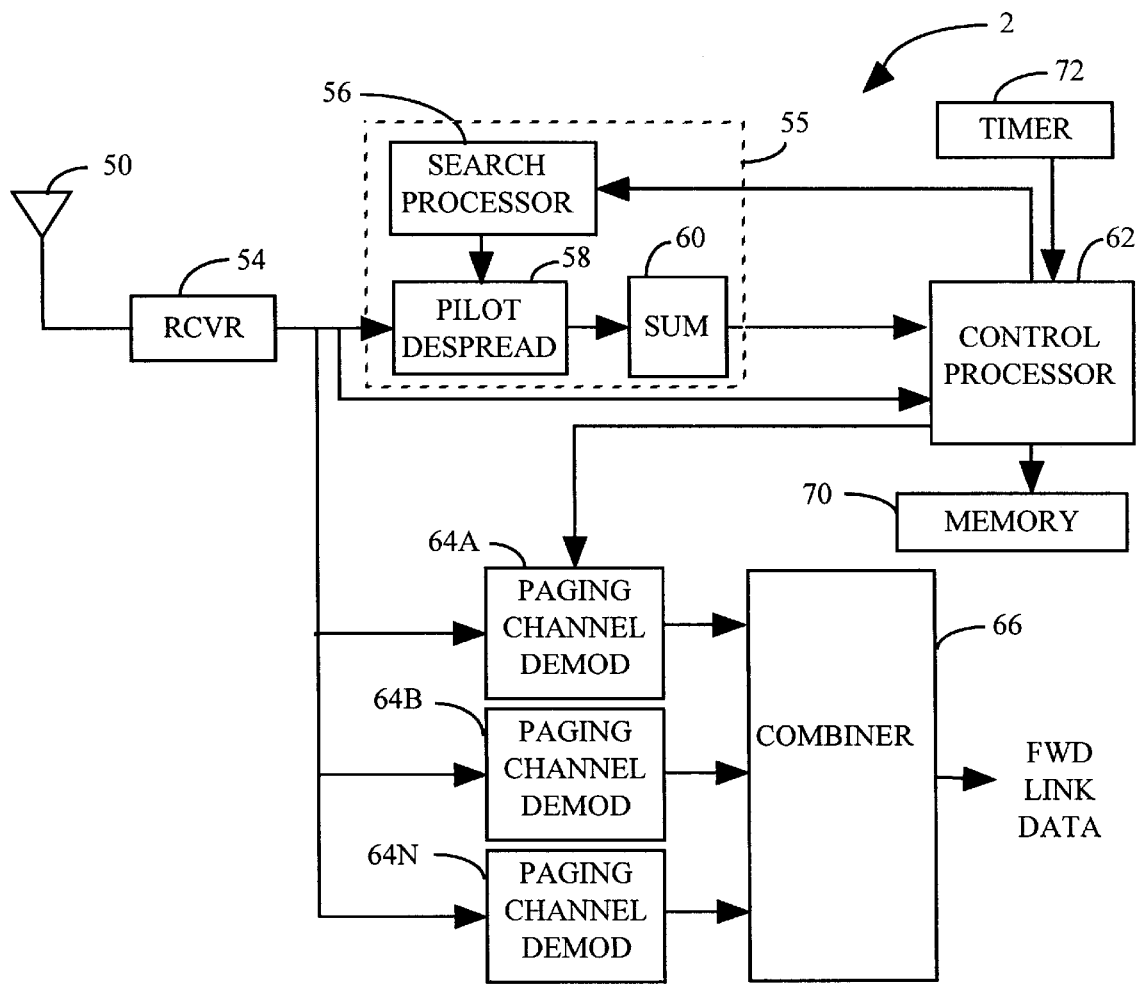
FIG. 1 is a block diagram of the circuit of the present invention.

FIG. 1 illustrates mobile receiver 2 of the present invention. Signals received by antenna 50 of mobile receiver 2 are provided to receiver (RCVR) 54 which amplifies, downconverts, and filters the received signal and provides it to pilot despreader 58 of searcher subsystem 55. In addition, the received signal is provided to paging channel demodulators 64A–64N. Paging channel demodulators 64A–64N, or a subset thereof, separately demodulate various multipath signals received by mobile receiver 2. The demodulated signals from paging channel demodulators 64A–64N are provided to combiner 66 which combines the demodulated multipath data, which in turn provides an improved estimate of the transmitted data.

Each of the demodulators 64A–64N is often referred in the art of CDMA receivers as one of the "fingers" of a rake-type receiver. It should be noted that pilot despreader 58 may also comprise more than one despreading element, or "finger", to separately despread more than one multipath component of the received pilot signal. In fact, pilot despreader 58 may be functionally similar and interchangeable with paging channel demodulators 64A–64N. In other words, pilot despreader 58 and paging channel demodulators 64A–64N may all be fungible demodulation resources which may be used to demodulate various multipath components from any of the signals transmitted by the base station (not shown). However, for clarity and simplicity, it has been illustrated in FIG. 1 as a single block and separate from paging channel demodulators 64A–64N.

In order to properly demodulate the paging channel, mobile receiver 2 must despread the pilot channel and recover its timing information. To this end, control processor 62 provides reacquisition parameters to search processor 56. Control processor 62 may be a conventional microprocessor as is known in the art. In the exemplary embodiment of a CDMA communication system, control processor 62 provides a PN offset to search processor 56 in accordance with the pilot signal to be reacquired. Search processor 56 generates a PN sequence which is used by pilot despreader 58 to despread the received signal. The despread pilot signal is provided to energy accumulator (SUM) 60 which measures the energy of the despread pilot signal, by accumulating the energy for predetermined lengths of time as is known in the art and further described in copending U.S. patent application Ser. No. 08/509,721, filed Jul. 31, 1995, entitled "METHOD AND APPARATUS FOR PERFORMING SEARCH ACQUISITION IN A CDMA COMMUNICATION SYSTEM," assigned to the assignee of the present invention and incorporated herein by reference.

The measured pilot energy values are provided to control processor 62. Control processor 62 digitally filters the pilot energy values in a digital filter (not shown). For example, control processor 62 may digitally filter the pilot energy values according to the method described in copending U.S. patent application Ser. No. 08/872,328, filed Jun. 10, 1997, entitled "PILOT SIGNAL DETECTION FILTER FOR A WIRELESS COMMUNICATION DEVICE," of Robbin D. Hughes, assigned to the assignee of the present invention and incorporated herein by reference. In the just-mentioned patent, a parallel digital filter is disclosed wherein a first branch of the parallel digital filter is for calculating a weighted historical average of a signal strength of the pilot signal in response to the pilot energy values, and a second branch of the parallel digital filter is for verifying the pilot energy values in a state machine, wherein transitions of the state machine are proportional to the magnitude of the pilot energy values. It should be noted that other pilot energy value filtering methods are known in the art and are readily adaptable to the present invention.

In addition to validating the presence of pilot signal energy, control processor 62 also tracks the pilot signal PN phase over time. Control processor 62 tracks this shift in PN phase by storing the current pilot signal PN phase in memory 70. Thus, as mobile receiver 2 moves through the environment, control processor 62 keeps track of the shift in PN phase of the received pilot signal caused by the changing propagation paths. As discussed in further detail below, control processor 62 is able to calculate the amount of "movement", or change, in the pilot signal PN phase over a given time period by comparing the stored PN phase with the current PN phase.

Once the pilot signal is acquired and despread, the mobile receiver 2 is capable of synchronizing its internal timer 72 to "system time", i.e. aligning its internal timer 72 to that of the base station (not shown). Mobile receiver 2 is then able to demodulate its assigned paging channel using paging channel demodulators 64A–64N. Messages transmitted on the paging channel from the base station to the mobile receiver 2 may include those for alerting the mobile receiver 2 to the presence of an incoming call (i.e. a "page" message), and those for periodically updating system parameters in the mobile receiver 2 (i.e. "overhead" messages). A list of exemplary messages found on a typical paging channel may be found in Telecommunications Industry Association (TIA)/Electronic Industries Association (EIA) Interim Standard IS-95, entitled "Mobile Station—Base Station Compatibility Standard for Dual-Mode Wideband Spread Spectrum Cellular System," at section 7.7.2.1. Each of the messages described in this section may contain a field which indicates whether another message is forthcoming. If an additional message is forthcoming, the mobile receiver 2 remains in the "awake" state to receive the additional message. If there are no additional messages, the receiver may immediately enter the sleep mode by partially powering down until it is time to "wake up" again to reacquire the pilot channel.

Control processor 62 also receives a timer input from timer 72. Timer 72 remains energized while the mobile receiver 2 is "asleep." Among other functions, the timer 72 meters the sleep period so that the remaining components of the mobile receiver 2 can be re-energized at the correct time to maintain synchronization with the paging channel and monitor for pages during the next successive slot. As previously stated, this "wakeup time" is, in the worst case, on the order of 80 ms. However, in the present invention as further discussed below, control processor 62 determines an adaptive wakeup time before the next assigned paging slot. Timer 72 typically includes a clock reference, such as a voltage controlled temperature controlled crystal oscillator (VCTCXO), or other crystal clock reference as is known in the art. Additionally, timer 72 includes a counter and control logic as is known in the art for metering time.

When control processor 62 receives a message during its assigned slot which indicates that there are no additional messages forthcoming, it stores the most recent pilot signal PN phase value in memory 70. Control processor 62 also retains a chronological list of the N most recent pilot signal PN phase values in memory 70. Control processor 62 compares the current pilot signal PN phase value with at least the most recent pilot signal PN phase value stored in memory 70 to determine the magnitude of any shift in the pilot signal PN phase value over the last wakeup period. Alternately, control processor 62 may also compare the current pilot signal PN phase value with each of the last N most recent pilot signal PN phase values stored in memory 70 to determine the magnitude of any shift in the pilot signal PN phase value during the last N wakeup periods.

The number, N, is preferably chosen to be sufficiently large to provide confidence in a developing trend of movement (or lack of movement) of the pilot signal PN phase. In the preferred embodiment, N is determined according to the wakeup interval. For example, if the interval between successive wakeup periods is about 2.5 seconds in duration (i.e., 2.5 seconds between successive assigned slots), then N may be chosen to equal 3 in order to measure the movement or lack thereof of the pilot signal PN phase over approximately the last 7.5 seconds. N may also be empirically chosen in order to provide an acceptable level of confidence in any developing trend.

Control processor 62 compares the measured magnitude of the shift in pilot signal PN phase over the last wakeup period to a threshold value, T. When multiple path components of the pilot signal are received, control processor 62 may choose to compare the measured magnitude of the shift in the earliest arriving multipath component. In the preferred embodiment, T is chosen according to the likelihood of reacquisition in the available time before the beginning of the next assigned slot, given a shift of T $\mu$sec in the pilot signal PN phase. In the exemplary CDMA system where one PN chip is on the order of 1 $\mu$sec long, T is preferably chosen to be 5–8 $\mu$sec. The shift threshold, T, may also be empirically chosen by measuring the time it takes for the mobile receiver 2 to reacquire the pilot signal given a shift of T $\mu$sec in the pilot signal PN phase. T may also be chosen according to whether one of the "fingers" of the pilot despreader 58 must be reassigned.

If the measured magnitude of the shift in pilot signal PN phase over the last wakeup period, or alternatively, the last N wakeup periods, is less than the shift threshold T, this indicates that the propagation environment of the mobile receiver 2 is fairly static. In this case, control processor 62 shortens the reacquisition time (i.e., the amount of wakeup time before the beginning of the next assigned slot) by X msec because the longer reacquisition time would not be necessary. For example, if the previous reacquisition time was the maximum reacquisition time, R=MAX msec, then the new reacquisition time determined by control processor 62 would be R=MAX−X msec. In other words, if the pilot signal PN phase has not changed significantly over the last N wakeup periods, the mobile receiver 2 is presumably stationary, and control processor 62 shortens the reacquisition time before the beginning of the next assigned slot to allow the mobile receiver 2 to remain in sleep mode longer, thereby conserving more power and extending battery life. This reduction in reacquisition time continues iteratively on each wakeup period until the reacquisition time reaches a minimum of R=MIN msec. In the preferred embodiment, X is chosen according to the likelihood of successful reacquisition of the pilot signal in the new reacquisition time, R−X, given a pilot signal PN phase shift of T $\mu$sec. For example, MAX may be on the order of 80 msec, and X may be on the order of 10 msec. Also, MIN is chosen according to the likelihood of successful reacquisition of the pilot signal in R=MIN msec, given a pilot signal PN phase shift of T $\mu$sec. MAX, X, and MIN may be determined empirically by one of ordinary skill in the art.

Conversely, if the measured magnitude of the shift in the pilot signal PN phase is greater than T msec, this indicates that the mobile receiver 2 is in a dynamically changing propagation environment, and thus control processor 62 increases the reacquisition time. This increase may occur in successive steps according to the magnitude of the shift. For example, a shift of T+1 $\mu$sec may be compensated for by adding Y msec back to the reacquisition time, R. The increase amount, Y, may be determined similarly to the decrease amount, X, or may be determined empirically. This increase in reacquisition time may continue iteratively on each wakeup period until the reacquisition time, R, is again equal to MAX msec. Alternatively, control processor 62 may immediately restore the reacquisition time to R=MAX msec if the magnitude of the shift in the pilot signal PN phase is greater than T $\mu$sec. If successive steps are used as opposed to immediate maximization of reacquisition time, the mobile receiver 2 will conserve more power, but at the cost of having a slower response time to rapid changes in the environment, and thus possible loss of an incoming message. Thus, in the preferred embodiment, control processor 62 immediately restores the reacquisition time to R=MAX msec if the magnitude of the shift in the pilot signal PN phase is greater than T $\mu$sec.

Figure 2:
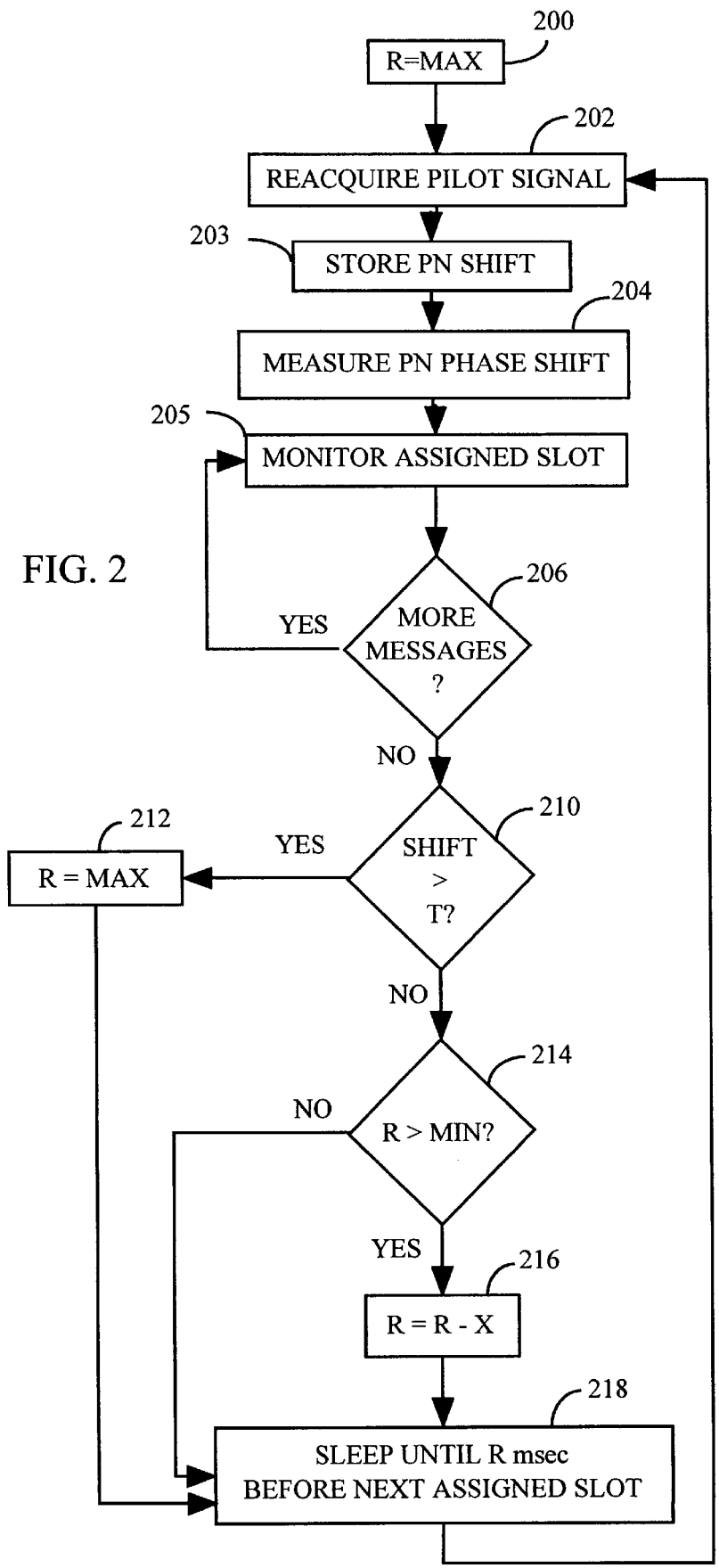
FIG. 2 is a flow diagram of the method of the present invention.

The method of the present invention is shown in FIG. 2. The process begins at block 200 with the initialization of the reacquisition time, R, to the value MAX. At block 202, the mobile receiver 2 reacquires the pilot signal, thereby calculating the current PN phase shift. At block 203, control processor 62 stores the current PN phase shift in memory 70. At block 204, control processor 62 measures the PN phase shift as described above, thereby calculating the shift from the previously stored PN phase shifts. Mobile receiver 2 then monitors its assigned paging slot at block 205. As long as there are forthcoming messages intended for the mobile receiver 2 as determined at decision 206, the mobile receiver 2 remains awake and continues to monitor the assigned paging slot at block 205.

If there are no more incoming messages on the paging channel intended for mobile receiver 2, then the process continues to decision 210. If control processor 62 determines, at decision 210, that the measured PN phase shift from block 204 is greater than the desired shift threshold, T, then the reacquisition time is immediately increased to MAX at block 212, and the flow continues to block 218 where mobile receiver 2 enters a sleep mode until R msec before the next assigned slot.

However, if control processor 62 determines, at decision 210, that the measured PN phase shift is not greater than the desired shift threshold, T, then the process continues to decision 214 where it is determined whether R is greater than the minimum reacquisition time, MIN. If not, then R remains the same (R=MIN) and the process continues to block 218 where mobile receiver 2 enters a sleep mode until R msec before the next assigned slot.

On the other hand, if control processor 62 determines, at decision 214 that the current reacquisition time, R, is greater than the minimum reacquisition time, MIN, then the process continues to block 216 where the reacquisition time, R, is reduced by X msec as described above with reference to FIG. 1. Again, the flow continues to block 218 where mobile receiver 2 enters a sleep mode until R msec before the next assigned slot. After the completion of the sleep period in block 218, the mobile receiver 2 awakens and reacquires the pilot signal at block 202, and the process repeats.

As can be seen from the above, mobile receiver 2 "wakes up" from sleep mode just in time to successfully reacquire the pilot signal, without spending extra time waiting for the beginning of the next assigned slot. Mobile receiver 2 accomplishes this by adaptively determining the reacquisition time before the next assigned slot in response to the measured shift in the pilot signal PN phase. As a result, mobile receiver 2 is able to successfully reacquire the pilot signal in a stationary environment as well as in a rapidly changing dynamic environment, without wasting battery power, and also without losing incoming page messages.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for adaptively determining a pilot signal reacquisition time, the method comprising the steps of:

measuring a magnitude of a shift in phase of said pilot signal;

comparing said measured magnitude to a shift threshold; and decreasing said reacquisition time if said measured magnitude is not greater than said shift threshold.

2. The method of claim 1 further comprising the steps of:

comparing said reacquisition time to a minimum reacquisition time; and decreasing said reacquisition time only if said reacquisition time is greater than said minimum reacquisition time.

3. The method of claim 2 further comprising the step of increasing said reacquisition time to a maximum reacquisition time if said measured magnitude is greater than said shift threshold.

4. The method of claim 3 further comprising the step of entering a sleep mode until said reacquisition time before a next assigned paging slot.

5. A circuit for adaptively determining a pilot signal reacquisition time, comprising:

a searcher subsystem for measuring a phase of said pilot signal; and a control processor for measuring a magnitude of a shift in said pilot signal phase, and wherein said control processor compares said measured magnitude to a shift threshold, and decreases said reacquisition time if said measured magnitude is not greater than said shift threshold.

6. The circuit of claim 5 wherein said control processor compares said reacquisition time to a minimum reacquisition time, and decreases said reacquisition time only if said reacquisition time is greater than said minimum reacquisition time.

7. The circuit of claim 6 wherein said control processor increases said reacquisition time to a maximum reacquisition time if said measured magnitude is greater than said shift threshold.

8. The circuit of claim 7 wherein said circuit enters a sleep mode until said reacquisition time before a next assigned paging slot.

* * * * *